US008302161B2

(12) United States Patent
Burch et al.

(10) Patent No.: US 8,302,161 B2
(45) Date of Patent: Oct. 30, 2012

(54) TECHNIQUES FOR ANONYMOUS INTERNET ACCESS

(75) Inventors: Lloyd Leon Burch, Payson, UT (US); Douglas G. Earl, Orem, UT (US); Robert Skousen Stilmar, Payson, UT (US); Stephen R. Carter, Spanish Fork, UT (US)

(73) Assignee: EMC Corporation, Hopkinton, MA (US)

( * ) Notice: Subject to any disclaimer, the term of this patent is extended or adjusted under 35 U.S.C. 154(b) by 980 days.

(21) Appl. No.: 12/036,523

(22) Filed: Feb. 25, 2008

(65) Prior Publication Data

US 2009/0217351 A1    Aug. 27, 2009

(51) Int. Cl.
G06F 7/04      (2006.01)
G06F 15/16     (2006.01)
G06F 17/30     (2006.01)
G06F 9/00      (2006.01)
G06F 17/00     (2006.01)
G06F 15/173    (2006.01)
H04L 29/06     (2006.01)

(52) U.S. Cl. ............ 726/3; 726/11; 709/217; 709/238; 709/246

(58) Field of Classification Search ............. 726/3, 11; 709/217, 238, 246
See application file for complete search history.

(56) References Cited

U.S. PATENT DOCUMENTS

| 6,266,704 | B1 | 7/2001 | Reed et al. |
| 7,096,200 | B2 | 8/2006 | Wang et al. |
| 7,587,499 | B1 * | 9/2009 | Haghpassand ............... 709/229 |
| 2001/0034709 | A1 | 10/2001 | Stoifo et al. |
| 2003/0080997 | A1 | 5/2003 | Fuehren et al. |
| 2004/0078475 | A1 | 4/2004 | Camenisch et al. |
| 2004/0088349 | A1 | 5/2004 | Beck et al. |
| 2004/0199789 | A1 | 10/2004 | Shaw et al. |
| 2005/0157706 | A1 | 7/2005 | Wang et al. |
| 2007/0143860 | A1 * | 6/2007 | Hardt ............................ 726/28 |
| 2007/0174630 | A1 * | 7/2007 | Shannon et al. ............ 713/183 |
| 2007/0208845 | A1 * | 9/2007 | Raheman et al. ............ 709/223 |
| 2008/0005264 | A1 | 1/2008 | Brunell et al. |

FOREIGN PATENT DOCUMENTS

EP    0922924 A2    4/2000
WO    WO-02057933 A    7/2002

OTHER PUBLICATIONS

"European Application Serial No. 09153285.3, Extended European Search Report, mailed May 29, 2009", 6 pgs.

* cited by examiner

Primary Examiner — Kambiz Zand
Assistant Examiner — Benjamin Kaplan
(74) Attorney, Agent, or Firm — Barry N. Young

(57) ABSTRACT

Techniques are presented for anonymous Internet access. Internet requests are intercepted within a firewalled environment before being routed over the Internet to destination sites. Each Internet requests is evaluated in view of policy and one or more anonymizers are selected in response to that evaluation. The Internet requests are then routed through the appropriate anonymizers for processing to the destination sites. A relationship between an Internet Protocol (IP) address associated with the firewalled environment and IP addresses of the destination sites is masked and hidden via the anonymizers from Internet observers. Moreover, a secure communication between the firewalled environment and the anonymizers is maintained.

20 Claims, 3 Drawing Sheets

TECHNIQUES FOR ANONYMOUS INTERNET ACCESS

BACKGROUND

Corporate surveillance (spying) has become a larger problem as the Internet is used more and more for day to day company activities. Secure communication protocols, such as Secure Sockets Layer (SSL) and Transport Layer Security (TLS), have solved problems associated with hiding the content of data being transmitted and communicated on the World-Wide Web (WWW), but these protocols do nothing to hide the site names (Uniform Resource Locator (URL) links) and Internet Protocol (IP) addresses that are visited.

So, even if SSL is being used in a communication over the Internet, any machine that can see the packets in route can find the requested and requesting Internet Protocol (IP) address involved in the Internet communication. IP address information can then be assembled to build a profile of the requesting site. The assembled profiles can then be used by corporate spies to gain unfair competitive advantages.

For example, consider an investment firm that spies on its competitors in the manner discussed above where IP addresses are inspected to build profiles. The spying investment firm can find out the sites that another investment firm is researching; this knowledge can be used to help the spying firm and hurt the firm associated with the site being monitored.

A typical solution to this problem is for enterprise's to use an anonymizer. An anonymizer can hide the URL's of the site being browsed. One issue with this is that the URL can also be hidden from the user's own corporation as well. Yet, many corporations need/desire to monitor or restrict that sites that employees visit. In order to correct such a situation, and in many cases for liability reasons, enterprises use internal firewalls to block known anonymizers. So, current anonymizers are generally not used by enterprises to solve corporate profiling and spying issues because the enterprises cannot monitor the sites visited by their own employees when anonymizers are permitted.

Another problem with existing anonymizers is that they are configured by the users that request them. So, the end user must manually go to the anonymizer site and use the anonymizer's interface to browse the Internet and WWW. Again, this scenario removes all control by the user's enterprise and places the burden of control on each individual user. Moreover, the end user may not understand the WWW environment and may not make good choices on how the anonymizer is to be used.

Thus, it is desirable to have improved techniques for anonymous Internet access from the perspective of an enterprise.

SUMMARY

In various embodiments, techniques are provided for anonymous Internet access. More particularly and in an embodiment, a method is provided for anonymous Internet access. An Internet Protocol (IP) address is inspected, the IP address originates from a principal and is directed to an external resource located over the Internet from the principal. A policy is evaluated in response to an identity associated with the principal and the IP address of the external resource. Next, a particular anonymizer is selected from a list of available anonymizers in response to the policy evaluation. Finally, a secure connection is established between the principal and the particular anonymizer for the particular anonymizer to access the external resource on behalf of the principal.

DETAILED DESCRIPTION

According to an embodiment, the techniques presented herein may be implemented within Novell products distributed by Novell, Inc. of Provo, Utah. Of course it is to be understood that any network architecture, device, proxy, operating system (OS), or product may be enhanced to utilize and deploy the techniques presented herein and below.

Figure 1:
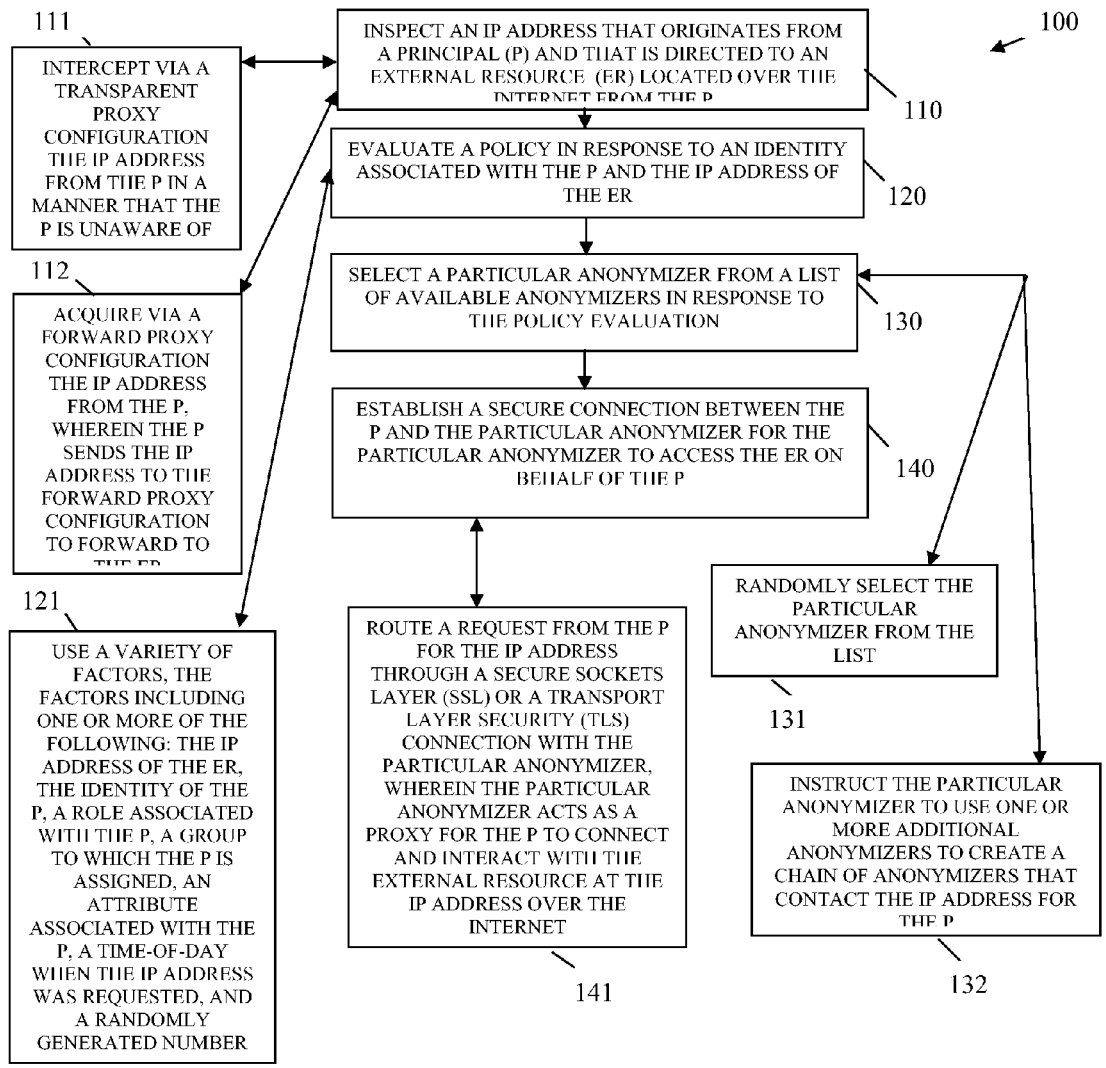
FIG. 1 is a diagram of a method for anonymous Internet access, according to an example embodiment.

FIG. 1 is a diagram of a method 100 for anonymous Internet access, according to an example embodiment. The method 100 (hereinafter "enterprise anonymizer") is implemented in a machine-accessible and computer-readable medium as instructions that process on a machine (computer, processor-enabled device, etc.) and the enterprise anonymizer is accessible over a network. The network may be wired, wireless, or a combination of wired and wireless.

The enterprise anonymizer is implemented within and processes on an enterprise machine within an enterprise's firewall environment. According to an embodiment, the enterprise anonymizer is implemented within a transparent proxy that intercepts client traffic destined for the Internet; the clients are unaware of and not preconfigured to interact with the transparent proxy. In still another embodiment, the enterprise anonymizer is implemented within a forward proxy that the clients are configured to direct Internet traffic through. In either embodiment, the enterprise anonymizer inspects and processes client traffic that emanates from the enterprise's secure firewall or Intranet environment and that is destined for external Internet sites.

At 110, the enterprise anonymizer inspects an Internet Protocol (IP) address that originates from a principal and that is directed to an external resource located over the Internet from the principal. A principal includes a user or an automated service. The external resource is a website, an external device, an external service, an external directory, and/or an external database, etc.

In an embodiment, the principal is a user that is interacting with a World-Wide Web (WWW) browser via an internal Intranet (firewall environment). The principal activates a Uniform Resource Locator (URL) link within a web page that is directed to an external web site (external resource). The URL is intercepted and inspected at 110 by the enterprise anonymizer and further processed in the manners discussed herein and below.

According to an embodiment, at 111, the enterprise anonymizer intercepts the IP address of the external resource that emanates from the principal via a transparent proxy configuration. This is done in a manner that the principal and a client associated with the principal is unaware of. In other words, the principal does not know that the IP address of the external resource was intercepted and inspected by the enterprise anonymizer.

In another case, at 112, the enterprise anonymizer acquires the IP address that emanates from the principal via a forward proxy configuration. In this situation, the enterprise anonymizer is preconfigured to communicate with a client of the principal, such that the client directly sends each external network requests (URL's) produced by the principal directly to the enterprise anonymizer for processing.

At 120, the enterprise anonymizer evaluates a policy in response to an identity associated with the principal and the IP address of the external resource. The policy can be selected and identified in response to a variety of information, such as an identity associated with the principal, the IP address, etc. So, in some situations the policy can be identity-based.

According to an embodiment, at 121, the enterprise anonymizer uses a variety of factors to evaluate the policy. Some of the factors can include one or more of the following: the IP address, the identity of the principal, an active security role assigned to the principal, an active group that the principal is assigned to, one or more attributes associated with the principal, a time-of-day when the IP address was requested by the principal, and/or a randomly generated number (discussed more completely herein and below), etc.

At 130, the enterprise anonymizer selects a particular anonymizer from a list of available anonymizers in response to the policy evaluation. So, the enterprise anonymizer acts as a corporate, enterprise, or firewall proxy for external resource requests that identifies and routes those requests through an anonymizer. Determining when to select an anonymizer for a particular external resource requests and which anonymizer to select are based on policy evaluation. Furthermore, in some cases, policy evaluation is identity-based. So, an external Internet observer that is attempting to spy on an enterprise that implements the enterprise anonymizer may only be able to see that the enterprise made a request for an anonymizer, the anonymizer then masks the request to the external resource. This prevents a profile from being developed by the external Internet observer and also permits the enterprise to control when and which anonymizer is selected and used. Furthermore, since the enterprise anonymizer knows and acquires the IP address for the external resource before the anonymizer is ask to assist, the enterprise can control which external resources are accessed and the manner in which they are accessed.

According to an embodiment, at 131, the enterprise anonymizer randomly selects the particular anonymizer from the list of available anonymizers. So, policy may dictate that any particular anonymizer that is selected to service the principal's request for the external resource be selected in a random manner. This further prevents an external Internet observer from developing patterns and monitoring any particular anonymizer. Since the enterprise anonymizer can select from a variety of anonymizers, an Internet observer will find it more difficult to develop patterns and monitor specific anonymizers for purposes of profiling an enterprise that implements the enterprise anonymizer. Furthermore, attempts to monitor can be confounded by random selection of a particular anonymizer, as discussed above.

In an embodiment, at 132, the enterprise anonymizer instructs the particular anonymizer selected to use one or more additional anonymizers to create a chain of cascading anonymizers. Each anonymizer in the chain passes the IP address of the external resource to the next anonymizer in the chain until the last in the chain contacts the external resource via the IP address on behalf of the principal. The chain makes it difficult for each anonymizer to track the relationship between an IP address associated with the principal (firewall IP address) and the IP address of the external resource. So, it is highly unlikely that when a chain of anonymizers are used that an Internet observer will be able to monitor and track the relationship for purposes of developing a profile of an enterprise that implements the enterprise anonymizer.

At 140, the enterprise anonymizer establishes a secure connection between the principal and the particular anonymizer. The particular anonymizer then accesses the external resource via the IP address on behalf of the principal. The secure connection ensures that content associated with the request from the principal is not discoverable and the use of the anonymizer ensures that the external resource and IP address are not associated with the principal and the firewall environment of the principal. Moreover, the selection, use, and configuration of the anonymizer are achieved via the enterprise anonymizer and not via the principal. In fact, in some cases the principal may be completely unaware that the anonymizer is being used on its behalf. This keeps control over Internet access with an administrator of an enterprise to maintain enterprise policy controls and permits the same enterprise to enjoy the benefits of an anonymizer to prevent or severely hamper corporate espionage.

In an embodiment, at 141, the enterprise anonymizer routes an original request from the principal for the IP address of the external resource through a secure sockets layer (SSL) or transport layer security (TLS) connection with the particular anonymizer. The particular anonymizer acts as a proxy for the principal to connect and interact with the external resource at the IP address over the Internet. Again, communication between the principal and the particular anonymizer is secure so all an Internet observer sees is the connecting firewall and the anonymizer. The anonymizer than masks the IP address of the external resource being requested by the principal because many other users and principals are simultaneously accessing the anonymizer with their own requests.

Figure 2:
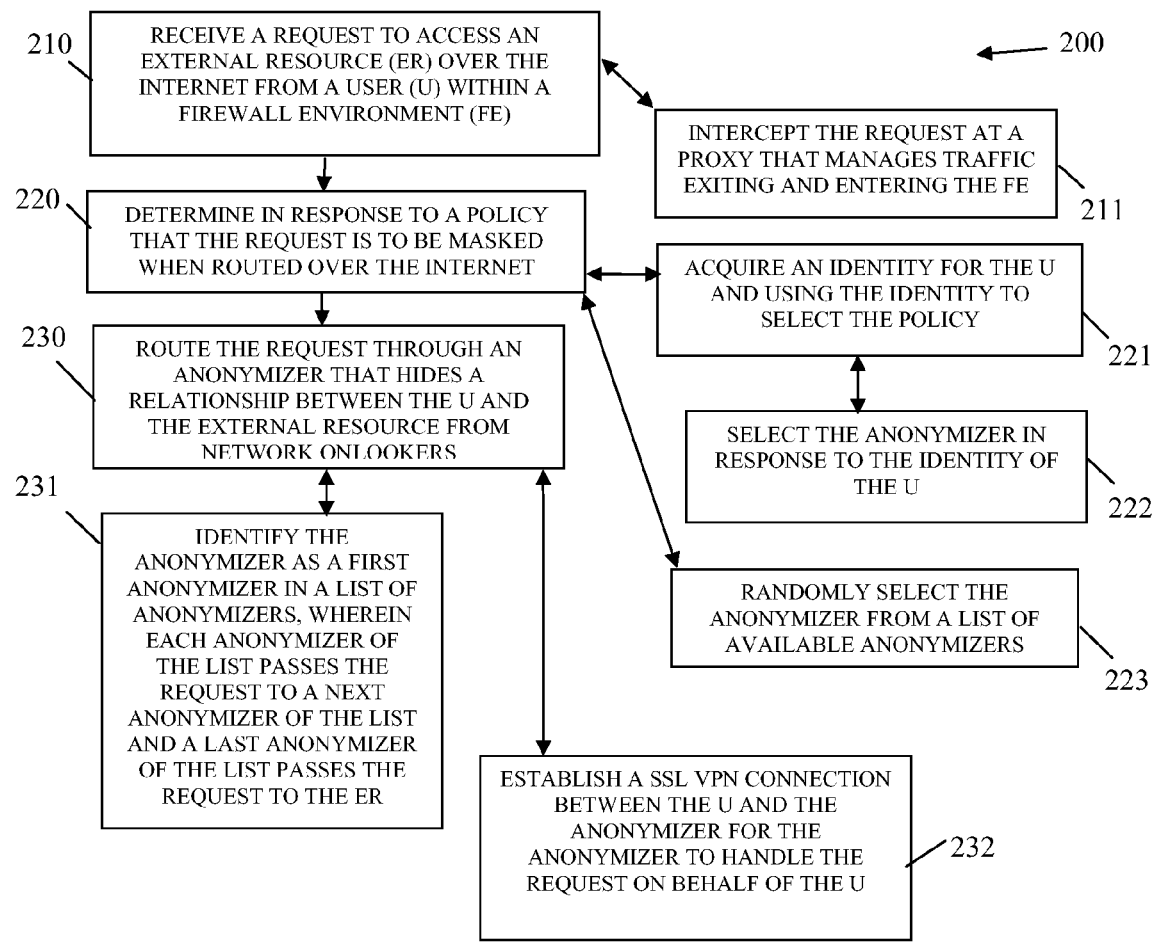
FIG. 2 is a diagram another method for anonymous Internet access, according to an example embodiment.

FIG. 2 is a diagram another method 200 for anonymous Internet access, according to an example embodiment. The method 200 (hereinafter "anonymizer service") is implemented in a machine-accessible and readable medium and is accessible over a network. The network may be wired, wireless, or a combination of wired and wireless. The anonymizer service presents an alternative and in some cases an enhanced perspective to the enterprise anonymizer represented by the method 100 of the FIG. 1.

At 210, the anonymizer service receives a request to access an external resource over the Internet. The request is received from a user within a firewall environment. So, the anonymizer service manages all Internet traffic that emanates from an enterprise.

According to an embodiment, at 211, the anonymizer service intercepts the request at a proxy. The proxy manages traffic exiting and entering the firewalled environment.

In a different embodiment, the anonymizer service is implemented at the sockets layer of protocol communication, such that the processing discussed herein is achieved at the protocol stack layer rather than via a proxy arrangement.

At 220, the anonymizer service determines that the request is to be masked when routed over the Internet from the firewalled environment. This is done via policy evaluation. The request is masked by using a secure connection that masked the content being transmitted from the user to the external resource and by using an anonymizer that masks and hides the IP address associated with the external resource. In this manner, an Internet observer cannot establish that the user of the firewalled environment contacted the external resource.

In an embodiment, at 221, the anonymizer service acquires an identity for the user and then uses the identity of the user to select the policy that is evaluated at 220. In still another case, at 222, the identity of the user can also be used to select the anonymizer. So, different users or different classes of users can be used to select different anonymizers. For example, corporate consul for an enterprise may require the use of a specific and more secure anonymizer or even perhaps a chain of anonymizers, since activity associated with corporate consul can involve sensitive corporate issues, such as mergers and acquisitions or Intellectual Property (IP) licensing issues.

In still another situation, at 223, the anonymizer service randomly selects the anonymizer from a list of available anonymizers. This may be desirable to throw off any Internet observers of the enterprise, such that there is no discernable pattern as to which anonymizer is being used.

It is noted that in some cases, the anonymizer may be specifically selected based on the identity or role of a user and in other cases the anonymizer may be randomly selected. So, a single enterprise can deploy anonymizers in both a specific and random manner depending upon the circumstances and/or identities of the users.

At 230, the anonymizer service routes the request through an anonymizer. The anonymizer hides a relationship between the user and the external resource from network onlookers (Internet observers). In other words, because the anonymizer provides service to multiple users and multiple corporations, the anonymizer is constantly issuing requests for web sites or external resources, such that when a particular request is received from the user of the anonymizer service an Internet observer is incapable of matching that request to any specific user.

To further complicate things and to make things even more secure, at 231, the anonymizer service identifies the anonymizer as a first anonymizer in a list of anonymizers. Each anonymizer in the list passes the request from the user for an external resource to a next anonymizer. The last anonymizer of the list passes the request to the external Internet resource that the original user requested via the anonymizer service. This means that even when the anonymizers keep logs that may be compromised it will be extremely difficult to trace back the request to the user. This increases security substantially and ensures that it is virtually impossible for an Internet observer to track a specific request emanating from an enterprise user to a specific Internet web site (external resource).

According to an embodiment, at 232, the anonymizer service establishes a SSL Virtual Private Network (VPN) connection between the user and the anonymizer. The Anonymizer and the user communicate in a secure manner, such that the content of the requests or exchanges are not compromised. The identity of the entity with which the user is communicating with can be found via the IP address of the endpoint for the entity, which is in this case is the anonymizer. However, the anonymizer is simply a conduit through which the user initially communicates, the target endpoint for communication is the external resource and the identity of that endpoints' IP address is masked or hidden via the anonymizer from any Internet observer. Thus, the user can hide communication occurring with a target external resource and can keep the exact communication secure via the SSL VPN. Such a situation can nearly completely eliminate Internet spying on Internet activity of an enterprise and at the same time permit an enterprise to still monitor and control its Internet usage via the anonymizer service.

Figure 3:
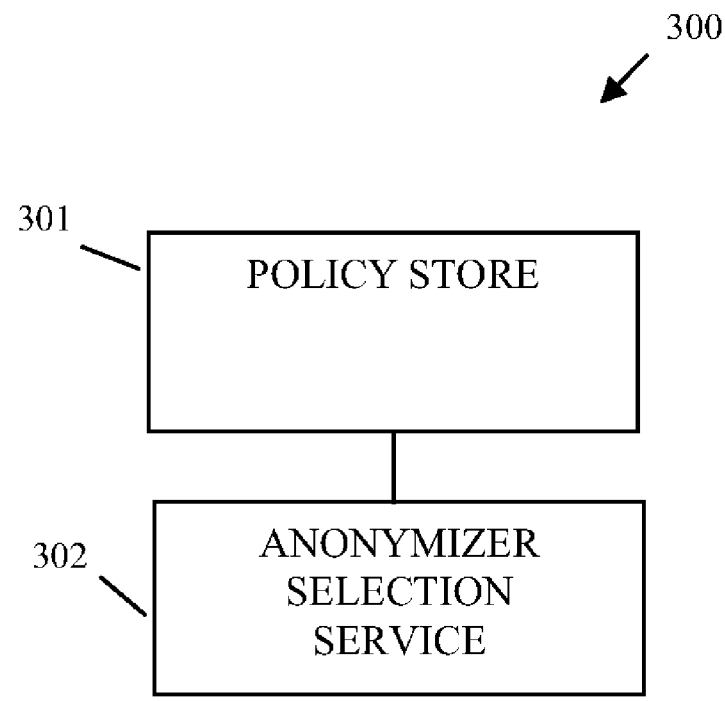
FIG. 3 is a diagram of an anonymous Internet access system, according to an example embodiment.

FIG. 3 is a diagram of an anonymous Internet access system 300, according to an example embodiment. The anonymous Internet access system 300 is implemented in a machine-accessible and computer-readable medium and is accessible over a network. The network may be wired, wireless, or a combination of wired and wireless. In an embodiment, the anonymous Internet access system 300 implements, among other things, the methods 100 and 200 of the FIGS. 1 and 2, respectively.

The anonymous Internet access system 300 includes a policy store 301 and an anonymizer selection service 302. Each of these and their interactions with one another will now be discussed in detail.

The policy store 301 is implemented in a computer-readable medium and is accessible to the anonymizer selection service 302. The policy store 301 may be controlled by an identity manager or identity service that requires authentication and secure communication to access it. The policy store 301 associates identities for resources, such as users, principals, devices, directories, data content, etc. with enterprise administered policy statements. The policy statements include conditions that when evaluated determine when and if an anonymizer is to be used for external Internet communications. The policy statements can also be evaluated to determine what anonymizer is to be used or how a selection from multiple anonymizers is to be made or even whether a chain or cascading list of anonymizers is to be used.

The anonymizer selection service 302 is implemented in a computer-readable medium and is to process on a proxy machine within a firewalled environment. The proxy machine acts as an intermediary to Internet access from and to the firewalled environment. In other words, principals (users and automated services) interact with external Internet sites via the proxy machine and the anonymizer selection service is implemented on and processes on the proxy machine, such that all Internet communication can be inspected and processed by the anonymizer selection service 302 in the manners discussed herein and below.

Example processing associated with the anonymizer selection service 302 was presented in detail above with reference to the methods 100 and 200 of the FIGS. 1 and 2, respectively.

The anonymizer selection service 302 intercepts URL requests from users within the firewalled environment, the URL requests are directed to external WWW sites. Next, the anonymizer selection service 302 acquires policies from the policy store 301. The policies are then evaluated to determine when particular URL requests are to be re-routed through anonymizers for purposes of masking the IP address of the firewalled environment from where the URL requests originate.

In some cases, it may be that some requests are not passed through any anonymizers. Here, the anonymizer selection service 302 uses policies from the policy store 301 to decide that direct access to a desired web site can be provided. In other cases, the policy may indicate that a specific anonymizer should be used to service a given request or that a random anonymizer should be used.

According to an embodiment, the anonymizer selection service 302 uses a variety of factors to acquire the policies from the policy store 302 and for purposes of evaluating the policies. Some factors may include the identity of the users making the request, the IP address associated with a request, the time of day for which a request is made, a role associated with a particular user, a group associated with a particular user, etc.

In a particular embodiment, the anonymizer selection service 302 chains certain URL requests to lists of anonymizers to further mask the IP address of the firewalled environment.

In an embodiment, the anonymizer selection service 302 is a transparent proxy that the users are unaware of and not pre-configured, via their clients, to interact with. In another case, the anonymizer selection service 302 is a forward proxy that the users, via their clients, are aware of and preconfigured to interact with.

According to an embodiment, the anonymizer selection service 302 randomly selects a number of the anonymizers for the URL requests to ensure no particular pattern can be detected from an observer outside the firewalled environment.

Figure 4:
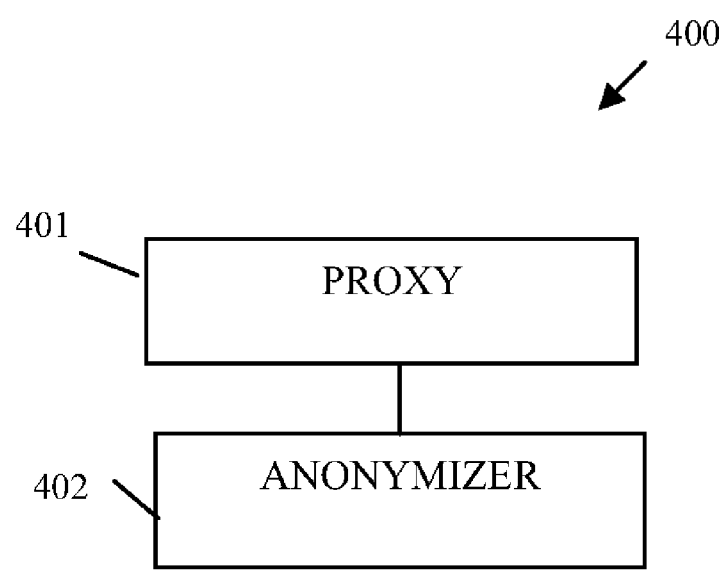
FIG. 4 is a diagram of another anonymous Internet access system, according to an example embodiment.

FIG. 4 is a diagram of another anonymous Internet access system 400, according to an example embodiment. The anonymous Internet access system 400 is implemented as instructions within a machine-accessible and computer-readable medium is accessible over a network. The instructions when executed by a machine (processing device, computer, etc.) implements the methods 100 and 200 of the FIGS. 1-2, respectively, and the system 300 of the FIG. 3. Furthermore, the network may be wired, wireless, or a combination of wired and wireless.

The anonymous Internet access system 400 includes a proxy 401 and an anonymizer 402. Each of these and their interactions with one another will now be discussed in detail.

The proxy 401 is implemented on a server machine within a firewalled environment. The proxy 401 handles traffic exiting the firewalled environment over an Internet connection and entering the firewalled environment from the Internet. Example processing associated with the proxy 401 was described in detail above with reference to the methods 100 and 200 of the FIGS. 1 and 2, respectively and with respect to the system 300 of the FIG. 3.

The proxy 401 uses policies to determine when Internet requests that emanate from with the firewalled environment are to be processed via the anonymizer 402 and routed through that anonymizer 402.

According to an embodiment, the proxy 401 resolves identities for principals associated with the Internet requests to select the policies for evaluation and to identify the anonymizer 402.

The anonymizer 402 is implemented on a machine outside the firewalled environment over the Internet.

In an embodiment, the anonymizer 402 routes a single one of the Internet requests through one or more additional anonymizers 402. This creates a chain or cascade of anonymizers 402 and makes trying to derive a pattern to discern what sites a user is visiting over the Internet nearly impossible or extremely difficult.

According to an embodiment, the anonymizer 402 services a variety of other users from other environments and associated with other Internet requests and wherein the anonymizer 402 masks an IP address associated with the firewalled environment when processing the Internet requests.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method implemented in a non-transitory computer-readable medium and for processing on a processor-enabled device, comprising:
   inspecting, by the processor-enabled device, an Internet Protocol (IP) address that originates from a principal and that is directed to an external resource located over the Internet from the principal;
   evaluating, by the processor-enabled device, a policy in response to the IP address of the external resource;
   selecting, by the processor-enabled device, a particular anonymizer from a list of available anonymizers in response to the policy evaluation, a variety of external anonymizers are available in the list and based on the policy evaluation the particular anonymizer is selected; and
   establishing, by the processor-enabled device, a secure connection between the principal and the particular anonymizer for the particular anonymizer to access the external resource on behalf of the principal, the processor-enabled device acting as a firewall proxy for the external resource and makes the secure connection with the particular anonymizer.

2. The method of claim 1, wherein inspecting further includes intercepting via a transparent proxy configuration the IP address from the principal in a manner that the principal is unaware of.

3. The method of claim 1, wherein inspecting further includes acquiring via a forward proxy configuration the IP address from the principal, wherein the principal sends the IP address to the forward proxy configuration to forward to the external resource.

4. The method of claim 1, wherein evaluating further includes evaluating the policy using a variety of factors, the factors including one or more of the following: the IP address of the external resource, an identity of the principal, a role associated with the principal, a group to which the principal is assigned, an attribute associated with the principal, a time-of-day when the IP address was requested, and a randomly generated number.

5. The method of claim 1, wherein selecting further includes randomly selecting the particular anonymizer from the list.

6. The method of claim 1, wherein selecting further includes instructing the particular anonymizer to use one or more additional anonymizers to create a chain of anonymizers that contact the IP address for the principal.

7. The method of claim 1, wherein establishing further includes routing a request from the principal for the IP address through a secure sockets layer (SSL) or a transport layer security (TLS) connection with the particular anonymizer, wherein the particular anonymizer acts as a proxy for the principal to connect and interact with the external resource at the IP address over the Internet.

8. A machine-implemented method implemented and residing in a non-transitory computer-readable medium and for processing on a processor-enabled device, comprising:
   receiving, by the processor-enabled device, a request to access an external resource over the Internet from a user within a firewall environment;
   determining, by the processor-enabled device, in response to a policy that the request is to be masked when routed over the Internet by having the processor-enabled device establish a secure connection with an anonymizer to access the external resource on behalf of the user; and routing, by the processor-enabled device, the request through the anonymizer that hides a relationship between the user and the external resource from network onlookers, the anonymizer selected from a list of available anonymizers also based on the evaluation of the policy, where different users or classes of users uses different ones of the anonymizers.

9. The method of claim 8, wherein receiving further includes intercepting the request at a proxy that manages traffic exiting and entering the firewall environment.

10. The method of claim 8, wherein determining further includes acquiring an identity for the user and using the identity to select the policy.

11. The method of claim 10, wherein acquiring further includes selecting the anonymizer in response to the identity of the user.

12. The method of claim 8, wherein determining further includes randomly selecting the anonymizer from a list of available anonymizers.

13. The method of claim 8, wherein routing further includes identifying the anonymizer as a first anonymizer in the list of anonymizers, wherein each anonymizer of the list passes the request to a next anonymizer of the list and a last anonymizer of the list passes the request to the external resource.

14. The method of claim 8, wherein routing further includes establishing a secure sockets layer (SSL) virtual private network (VPN) connection between the user and the anonymizer for the anonymizer to handle the request on behalf of the user.

15. A computer-implemented system, comprising:

a non-transitory computer-readable medium configured with a policy store residing in the non-transitory computer-readable medium and accessible to an anonymizer selection service; and a proxy machine that is a processor enabled device and is configured with the anonymizer selection service, the anonymizer executes on the proxy machine within a firewalled environment, wherein the proxy machine acts as an intermediary to Internet access from and to the firewalled environment;

the anonymizer selection service intercepts uniform resource locator (URL) link requests from users within the firewalled environment that are directed to external world-wide web (WWW) sites and acquires policies from the policy store, evaluates the policies to determine when particular URL requests are to be re-routed through anonymizers to mask an Internet Protocol (IP) address of the firewalled environment from where the URL requests originate, each request is evaluated in view of a particular policy to select a particular anonymizer from the anonymizers to service that request and each request is tied to a secure connection between a particular user and a particular anonymizer.

16. The system of claim 15, wherein the anonymizer selection service uses a variety of factors to acquire the policies from the policy store and when evaluating the policies.

17. The system of claim 15, wherein the anonymizer selection service chains certain URL requests to lists of the anonymizers to further mask the IP address of the firewalled environment.

18. The system of claim 15, wherein the anonymizer selection service is a transparent.

19. The system of claim 15, wherein the anonymizer selection service is a forward proxy.

20. The system of claim 15, wherein the anonymizer selection service randomly selects a number of the anonymizers for the URL requests to ensure no particular pattern can be detected from an observer outside the firewalled environment.

* * * * *